(No Model.)
G. W. BARRETT.
HYDRAULIC ENGINE.
No. 438,600. Patented Oct. 21, 1890.
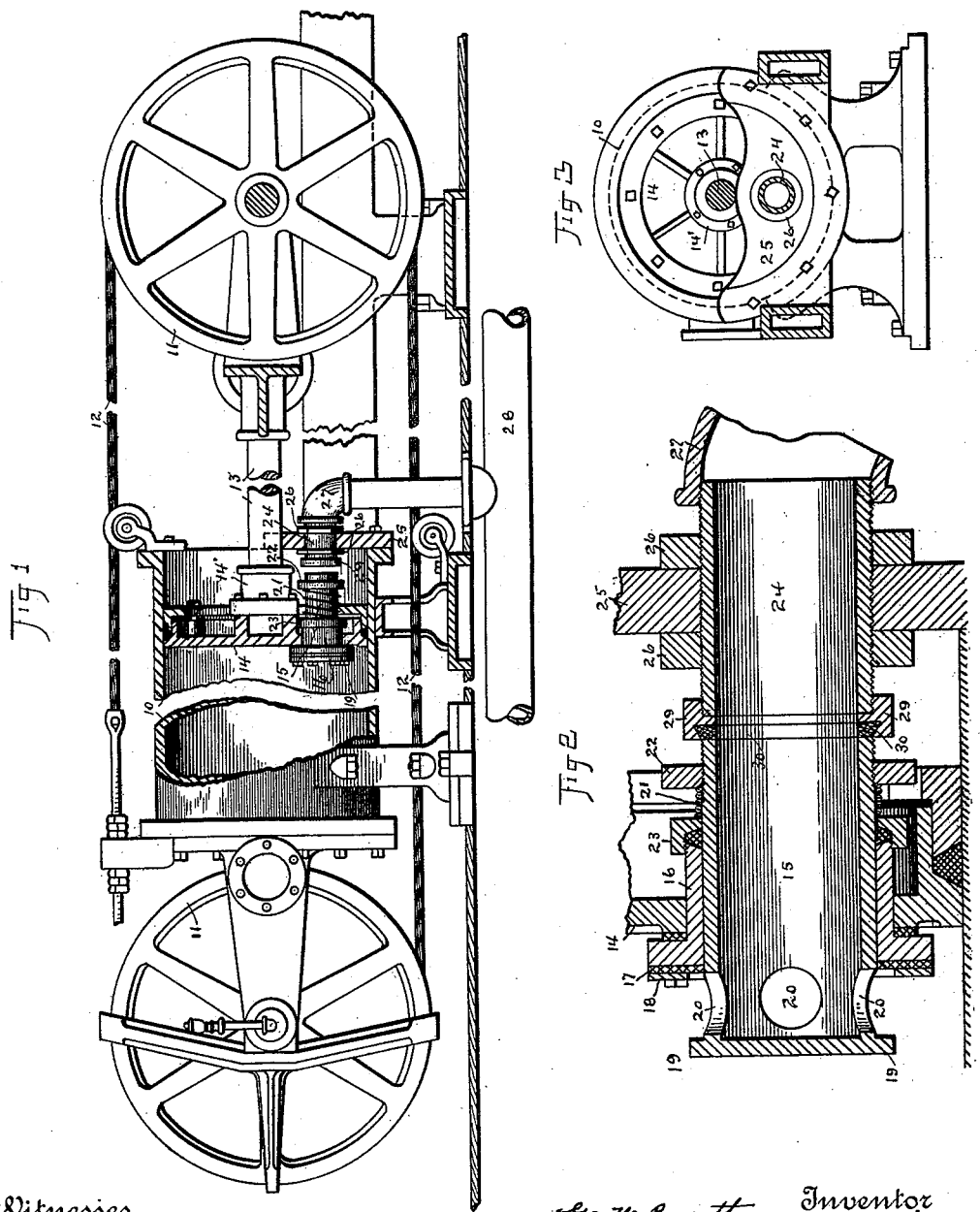
Witnesses
N. S. Aurstutz
G. B. Moser
Geo. W. Barrett  Inventor
By his Attorney H. T. Fisher

UNITED STATES PATENT OFFICE.

GEORGE W. BARRETT, OF CLEVELAND, OHIO.

HYDRAULIC ENGINE.

SPECIFICATION forming part of Letters Patent No. 438,600, dated October 21, 1890.

Application filed March 10, 1890. Serial No. 343,250. (No model.)

*To all whom it may concern:*

Be it known that I, GEORGE W. BARRETT, a citizen of the United States, residing at Cleveland, in the county of Cuyahoga and State of Ohio, have invented certain new and useful Improvements in Hydraulic Engines; and I do hereby declare that the following is a full, clear, and exact description of the invention, which will enable others skilled in the art to which it appertains to make and use the same.

My invention relates to improvements in hydraulic engines; and the invention consists in the construction and arrangement of the parts, all as hereinafter described, and clearly pointed out in the claims.

In the accompanying drawings, Figure 1 is a longitudinal vertical section of a horizontally-arranged cylinder carrying sufficient of its usual attachments to show its character and use, said cylinder being broken out centrally and the ends brought near together to accommodate the view to the limits of the sheet, and the left-hand end drawn in full lines. Fig. 2 is a sectional view of a section of the piston centrally through the safety-valve and a similar view of the escape-pipe and its supporting and connected mechanism, the valve being shown as seated and in full working position. Fig. 3 is an elevation of the rear end of the cylinder, showing the support for the escape-pipe and said pipe in section.

The invention is illustrated in connection with a horizontal hydraulic engine; but though this is the relation in which it is here shown I do not consider the invention thus limited in its use, but may use it in engines having vertical cylinders and wherever a piston and fluid-pressure are employed and a safety-valve of this general nature is practicable and desirable. Furthermore, a number of parts are shown in the drawings which are not of my invention, but which serve to fix the classification of the invention and the relation in which it is employed in engines of this type. Among the old and well-known features here referred to are the cylinder 10, having any sufficient base-support, the sheaves 11, the cable 12, the piston-rod 13, and other subordinate and well-known parts.

The piston 14 in cylinder 10 is connected with the piston-rod by a thimble 14' and has the usual packing and packing ring or rings about its periphery. At one side of the center of the piston and in this instance, for convenience, beneath the piston-rod, the piston is formed with an opening to accommodate the safety-valve 15. First within this opening, which extends through the piston from side to side, is a thimble-shaped bearing 16, bolted to the piston through its flanged head, suitable packing being interposed between the parts. Upon the face of the head of thimble 16 is a rubber or other suitable gasket 17, held in position by a ring 18, secured by the same bolts that fasten the thimbled bearing 16 in place. The ring 18 is narrower than the gasket 17, so as to leave a bearing-surface within said ring for the flange 19 on the head of the safety-valve, whereby when the valve is closed it is sealed water-tight at this point.

The valve 15 is tubular in form and of greater length than the depth of the piston in cross-section, so that it may have the sliding movement in said piston requisite to the proper performance of its functions. Normally the said valve is seated with its flanged head 19 resting firmly on the gasket 17, thus hermetically sealing the valved passage through the piston; but in certain emergencies, as when by accident or otherwise the inlet-valve is not turned off as the car reaches the top landing, the said valve is opened to relieve the pressure and avoid consequent damage, and to this end is arranged to slide in its bearings and open the passage-way it provides. This passage-way is through the openings 20, formed in the neck of the valve, and thence through the valve itself to the discharge-pipe; but the valve is designed to be opened only when extraordinary occasions render it necessary, and hence is provided with means that hold it firmly on its seat at all other times. These means consist, primarily, of a heavy spring 21, which is coiled around the outer end of the valve and bears against a sleeve 22 at one side and a stuffing-ring 23 on the other side. The ring 23 is screwed on the outer extremity of the bearing 16, and the sleeve or ring 22 is threaded and adjustable on the threaded outer end of the valve 15, where it serves both as a bearing for the spring 21 and to increase or diminish its tension. Hence when the valve is forced inward the pressure is against the tension of spring 21, and this spring has sufficient strength to promptly reseat the valve when the pressure is relieved. The openings 20 may be of any design or form, and the outlet provided through the valve is designed to offset the inlet and thus produce an equilibrium in the pressure and secure absolute safety under whatever circumstances the valve is brought into action. The piston 14 thus equipped with its safety mechanism is shown in Fig. 1 in what we will suppose to be the end of its accustomed outward movement, and the safety-valve of course is closed. Then if further movement occurs the danger-point will not be reached before the end of the safety-valve strikes the fixed escape-pipe, and the said valve is gradually opened until the full opening occurs, as seen in Fig. 2. The escape-pipe consists of a short section of pipe 24, supported in an abutting or buffer plate 25, Fig. 3, firmly bolted to the end of the main cylinder. Lock-nuts 26 on either side of said plate hold the pipe 24 in place. At its outer end an elbow-pipe 27 connects the pipe 24 with the sewer or other waste-pipe 28, and at its inner end the said pipe 24 has screwed thereon a ring 29, provided with a seat for a mouth-piece 30, of lead or other equivalent material adapted to make a close union with the valve. The extremity of the valve and the pipe 24, with its mouth-piece, are so arranged that they exactly register, and when in contact form what is equivalent to a continuous pipe-opening from the front of the piston through to the sewer. This contact will continue until the piston has moved a sufficient distance forward to withdraw the valve; but when this occurs the openings 20 are closed and the further escape of fluid is prevented. Thus it occurs that the safety-valve is never open except when it forms a close union with the mouth of the escape-pipe.

Having thus described my invention, what I claim as new, and desire to secure by Letters Patent, is—

1. The piston provided with an opening from front to rear and a bearing for a valve in said opening, in combination with a valve adapted to slide longitudinally in the bearing and provided with a spring and a movable sleeve forming an outside bearing for the spring, substantially as set forth.

2. A piston having an opening from side to side, a safety-valve extending through said opening, and a stationary discharge-pipe opposite said valve and adapted to receive the fluid therefrom, substantially as described.

3. In a hydraulic engine, a cylinder and an escape-pipe supported in the open end of said cylinder, in combination with a piston having a tubular spring-pressed safety-valve extending through from side to side and arranged in exact alignment with the mouth of the escape-pipe, substantially as set forth.

Witness my hand to the foregoing specification this 1st day of March, 1890.

GEORGE W. BARRETT.

Witnesses:
H. T. FISHER,
N. S. McLANE.